Feb. 18, 1941. J. MEERSTEINER 2,232,336
FASTENING SCREW
Filed July 18, 1938 2 Sheets-Sheet 1
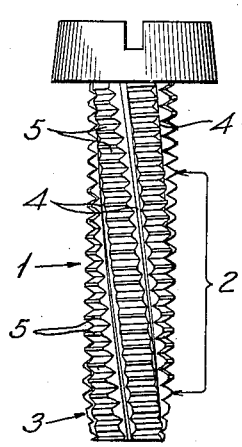
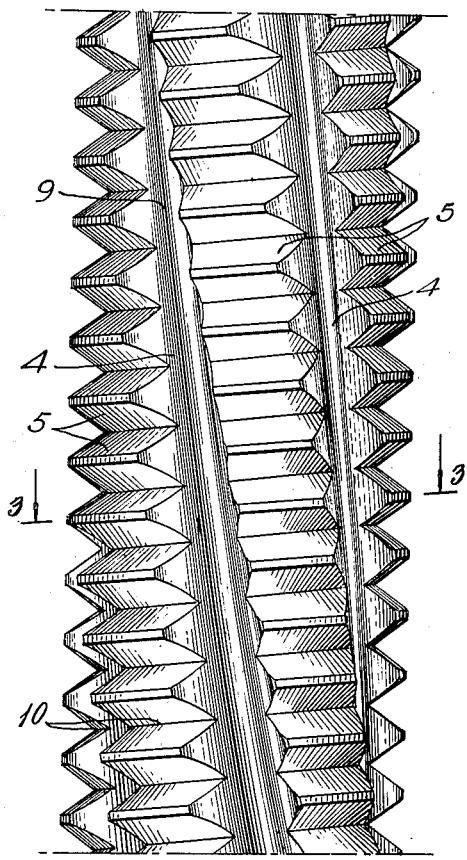
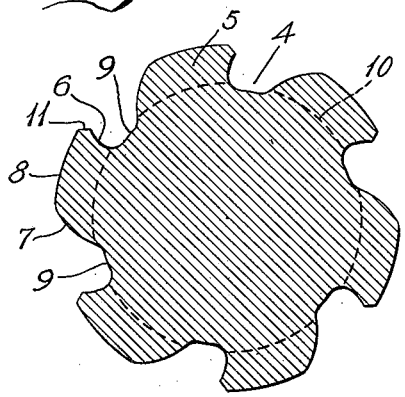
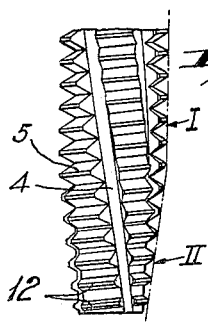
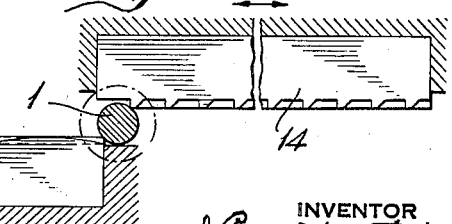
INVENTOR

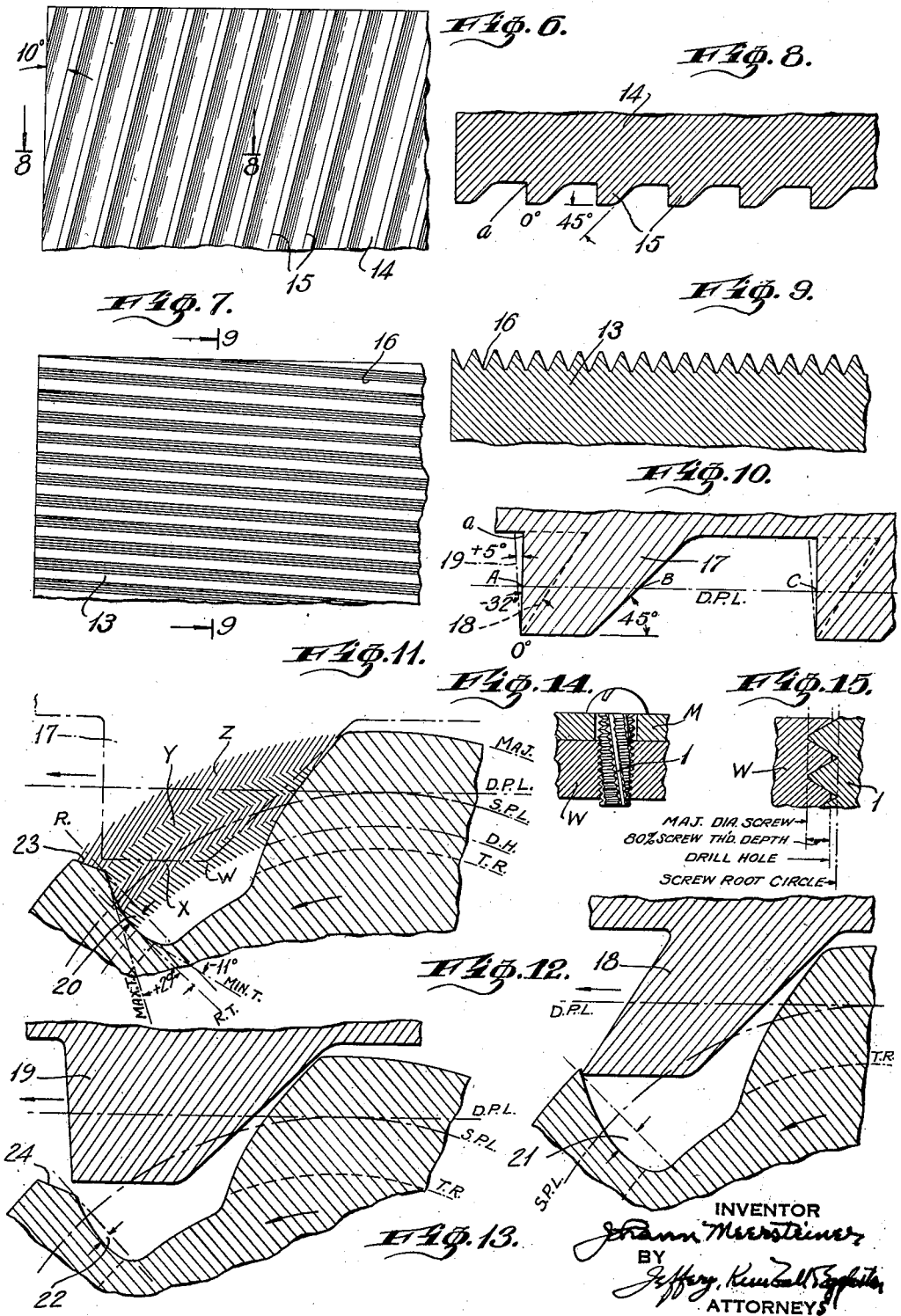

Patented Feb. 18, 1941

2,232,336

UNITED STATES PATENT OFFICE 2,232,336

FASTENING SCREW

Johann Meersteiner, West New York, N. J.; Frieda Meersteiner administratrix of said Johann Meersteiner, deceased Application July 18, 1938, Serial No. 219,768

9 Claims. (Cl. 85—47)

The invention is a novel metal fastening screw adapted to cut its own thread in a presized unthreaded hole in metal and like hard material and to retain itself in place by frictional contact of its thread with the thread it has cut, with the same security as if the hole had been previously tapped in the usual manner. It is of the well known type in which the thread-cutting is done by the leading ends of thread segments defined by grooves or channels extending lengthwise of the shank of the screw.

The object of the invention is to devise a readily insertible screw of this nature whose longitudinal grooves shall provide the leading ends of its thread segments with thread-cutting edges of enhanced efficiency, and be of such number and character as to insure abundant cutting ability and adequate chip-disposing capacity which screw shall be capable of production at commercial speed and cost, in very small as well as in larger sizes, this latter property being quite as important as any other.

These and other objects are realized in the invented fastening screw described in the specification and a selected example of which is illustrated in the drawings wherein:

Fig. 1 is a side elevation of a fastening screw embodying the invention;

Fig. 2 is a corresponding view much enlarged of the bracketed portion 2 of the screw shown in Fig. 1;

Fig. 3 is a section on line 3—3, Fig. 2;

Fig. 4 is a diagrammatic top plan view of a pair of dies which may be used in making the screw. They are in readiness for rolling the blank between them. The head of the blank is shown phantom;

Fig. 5 is a detail longitudinal section of part of the shank of a #10 N. C. 24 screw illustrating a tapered entering end different from that of the fastening screw shown in Figs. 1 to 3;

Fig. 6 is a plan of the grooving die for rolling the longitudinal grooves in the fastening screw, parts of the die being broken away;

Fig. 7 is a corresponding view of the threadrolling die which cooperates with the grooving die;

Fig. 8 is a section on line 8—8, Fig. 6;

Fig. 9 is a section on the line 9—9, Fig. 7;

Fig. 10 is an enlarged detail section, on a scale of 25 to 1, of enough of a grooving die for an N. C. 24 screw to show the relation between successive die ribs thereon, the rib face, and backslope angles of the preferred die rib, and also representative permissible alternative rib face angles in dot-and-dash lines and in dotted lines, respectively;

Figs. 11, 12 and 13 are incomplete enlarged illustrative detail sections through the screw being rolled by die ribs having, respectively, the several face angles (shown in Fig. 10 by solid, dotted, and dot-and-dash line, viz. 0° in Fig. 11, −32° in Fig. 12 and +5° in Fig. 13), the backslope angle being 45° in each figure. Fig. 14 is a vertical section showing the long taper screw engaged in the thread it has cut in its presized hole, and Fig. 15 is an enlarged detailed section showing the relation of the engaged threads, depth of screw cut, etc.

Referring more particularly to Figs. 1, 2, 3 and 5, the fastening screw of the first three of these figures, with the modification of it shown in Fig. 5, and which is of the non-burrowing type being neither bit nor drill, is chosen as an illustrative embodiment of the invention and is one of a variety of characteristic forms it might take. The head of this screw may be slotted, as indicated, or shaped for the application of a wrench. Its shank 1 of cylindrical contour has the tapered entrance end 3 and is provided with longitudinal grooves 4 defining thread segments 5 to whose leading ends they are in undercut relation, as indicated at 6, and to whose trailing ends they give elongated curvature. Such elongated curvature extends inward and rearward from the crest 8 to the bottom 9 of the groove, or, beginning at the groove bottom, extends outward and away from the adjacent leading end to the crest, the trailing end being thus circumferentially relieved and the contour being slightly convex. The trailing and the threadcutting ends are thus seen to be of different configuration and not symmetrical. The grooves face or open—not radially outward—but forward, i. e., in the direction of thread-cutting rotation, the median line bisecting the groove angle extending outward and forward through the open side of the groove. The grooves are bottomed between the opposed end faces of the thread segments and separate said end faces at the groove bottom and more widely at the crest. Substantial groove width at the bottom with greater width toward the open side and greatest width along the crest of the thread facilities waste disposal providing adequate room therefor. V-shaped grooves and especially V-shaped grooves having both sides convex and meeting in a line at or slightly below the adjacent thread valleys are thus avoided. Various other advantages of the applicant's location and groove cross-contour will more expressly appear presently. It is evident, however, that the chip-disposing capacity of each such groove is large and their total capacity ample, since, subject to obtaining sufficient holding contact area between the screw and the thread it cuts in the presized hole, there may be as many longitudinal grooves as desired. These grooves leave the threaded shank undiminished in its substance, and as they extend not substantially deeper into the body of the screw than the root circle of the thread, they do not trench upon or weaken the body section. To better free the chips cut by the leading ends of the thread segments as the screw is turned into the previously prepared hole, the bottom of the groove is, however, located a little below the thread valleys or root circle 10 where the cutting edges end. This leaves the groove bottom smooth and free from angular pockets in which chips might be caught.

It will be observed that these grooves extend in steep spirals in the reverse sense to the direction of the thread of the screw, crossing its spires substantially at right angles. This gives a shorter gap in the helix line of the thread than if die groove crossed the thread line at any other angle. The ends of the gap, i. e. the trailing and the leading ends of successive thread segments on opposite sides of the groove are therefore nearer together, both actually, and when projected onto a line parallel with the axis of the screw, than would be the case if the spiral were in the same sense as the thread. Under the latter conditions the angle of the groove to the thread must be other than a right angle and the gap in the thread line necessarily longer and its ends further apart. With the reverse spiral arrangement, therefore, the following cutting end has the shortest distance to descend. This makes for exact thread cutting, since it avoids danger of duplication or marring by a following cutting end, of the thread groove cut by the leading ends of the thread segments in advance of it.

Effective cutting-tool edges of enhanced cutting power characterize the leading ends of the thread segments of the illustrated screws, as will be apparent from Figs. 2 and 3 and from Figs. 11, 12 and 13, hereinafter considered, and all of which show undercut ends. The structure resembles that of a milling cutter with concave cutting edges. And the reverse spiral character of the grooves—the most effective arrangement—locates the leading thread-cutting edges of the ends of the successive segments, in the respective tiers of thread segments between adjacent grooves, each a little above and in advance of the next cutting element below it, as will be seen on following the advance or right side of the grooves in the screw figures upward from the bottom. Each tier thus constitutes a multiple cutter, the cutting elements of which act successively but without appreciable gap with a continuous cutting movement which relieves the screw from shock or strain and promotes efficiency of the thread-cutting operation. The multiplicity of longitudinal grooves give the screw abundance of cutting power and, by reason of the abrupt character of the cutting edges of the leading ends of the thread segments, the cutting action is free and smooth.

At least three thread-cutting grooves are required to give sufficient cutting and chip-disposing ability in screws to be used in presized holes in the better flowing materials, as steel and iron. More are desirable even with these and with brittle materials more chip space is needed and more than three longitudinal grooves required.

The contour of the thread-cutting leading ends of the thread segments already referred to will be discussed more in detail presently, particularly in connection with Figs. 11 to 13, but it is here noted further that, while the curved undercut 6 may be carried all the way to the crest 8, as shown in Fig. 12, it is generally preferred to carry it only to a point short of the crest a little below and in advance thereof, as best shown in Figs. 3, 11 and 13. The portion 11 of the face of the leading end of the segment, in Fig. 3, extends outward and rearward to the crest from the line in which the undercut meets it. This is a very strong form of cutting tooth, particularly desirable where the screw is to cut its thread and secure itself in steel or other especially hard, tough material since a tooth of this shape eliminates all fear of breakage and consequent injury to the thread as well as the screw. The form of tooth in which the undercut extends to the crest is of especial advantage in threading brittle material, such as Bakelite and other pressed materials, where a clean cut and efficient chip formation and disposal are at a premium. It is best also for screws not subjected to a hardening process.

Fig. 5 illustrates a modified entering end of a fastening screw embodying the invention having a taper much elongated as compared with that of the leading end 3 of the screw of Fig. 1, and in which the pitch and the thread contour are maintained to the end of the screw, as shown in the thread segments 12. The lines I and II indicate respectively the cylindrical and the tapered part. In the screw of this figure also, the undercut may extend to the crest on all the leading end segments, or as indicated, to a point short of the crest on the end segments of full height and on those approaching full height, and to the crest only on the first two or three leading end segments 12 on each groove starting next the blunt entering end of the elongated taper, which are of little height. The more gradual longer taper is of advantage particularly in connection with the contour of the leading ends of the thread segments just referred to. This will further appear when the operation of the screw is taken up.

The increase in the amount of cutting power and the enhancement of the cutting quality of the screw by reason of its effective contours described herein and the exactness which characterizes the screw, makes it possible to secure greatly improved holding contact by enlarging the contact area of the thread on the screw with the thread which it has cut in the wall of the hole. This is done by presizing the hole in the material into which the screw is to be turned to a smaller radius than that which has been found practicable heretofore for self-tapping screws of this general type. If the radius of the hole were the same as that of the root circle of the screw, the cut would be the full depth of the thread. But to avoid subjecting such screws to a torsional strain they might be unable to endure, the drill hole had to be made relatively large, its usual radius being the radius of the root circle of the screw plus 40% to 50% of the depth of the thread on the screw, so as to give a cut of from only 60% to 50% of said thread depth. In the present screw, on the contrary, the radius of the drill hole may range, and preferably does range, from the radius of the root circle, plus 20% of the thread depth on the screw, to the radius of the root circle, or, in terms of diameters, from the diameter of the root circle plus twice 20% of the thread depth on the screw to the diameter of the root circle. The depth of the thread cut in the wall of the presized hole by the present screw is thus from 80% to 100% of the depth of the thread of the screw. The percentage is greated in relatively soft material than in harder material. This reduction in the size of the permissible drill hole is a distinctive and important advantage of the invented screw. Figs. 14 and 15 show these relationships. The screw 1 in Fig. 14 is engaged in the presized hole in the work W, thereby securing the member M. Reference may be had also to Fig. 11.

Assuming a presized hole preferably within the diameter range stated, the operation of turning in the screw is as follows:

The tapered entering end of the screw is inserted into a previously prepared hole until its tapered portion contacts near its leading end with the wall of the hole, whereupon the metal of the wall as the screw is pressed inward and turned rolls freely and continuously into the wide open side of the forwardly facing groove. The trailing end with its relieved crest and contour of elongated curvature moving forward easily in advance of the groove leads or feeds the metal into the groove continuously as the leading end of the thread segments 3 in Fig. 1, 12 in Fig. 5, advance and by their concave undercut end edges smoothly cut from the wall of the hole a thin chip which drops into the adjacent groove 4. Successive cutting ends, repeat this action, each time, a little further out from the screw axis, each successive cut thus gradually and continuously deepening the thread groove. Most of the cutting is done on the taper both in the screw of Fig. 1 and in that of Fig. 5, but especially in the latter. It will be noted that, even where the undercut does not proceed all the way to the crest on the segment ends of full height, it does so proceed on the first cutting leading ends of segments on the screw taper to be engaged and on a number of next succeeding leading segment ends thereon, since these are of little height. Following thread segments, trailing in the same thread groove, successively present their advance undercut edges, until thread segment ends of the full thread height force the metal of the thread valley to its full intended depth and cross-section. Where the undercut is not carried all the way to the crest, the backwardly slanting portions 11 have a continuous ironing action to complete the thread in the wall of the hole in exact smoothly continuous fashion. The screw having cut its thread holds itself firmly in contact therewith in the hole.

One illustrative and preferred apparatus, and method of fabricating the invented screw is characterized by rolling the longitudinal grooves, and the threads they interrupt in the skin of the blank in the same operation at opposite sides of the blank, the thread-forming and the longitudinal groove-forming elements (die ribs) being allocated to the respective dies, so that they perform their distinctive functions without interference and in harmony, the threads and grooves being increased gradually and proportionately to each other until each attains its full cross-section in the finished screw. Applicant's copending application Ser. No. 127,266, filed February 23, 1937, of which the present application is a continuation in part is directed to such a method and apparatus.

Further particular and preferred apparatus and methods of this nature are illustrated in Figs. 4 to 13 inclusive, wherein in Fig. 4 is shown diagrammatically a screw rolling apparatus, in which the threading die 13 is indicated as fixed and the grooving die 14 as reciprocating. Plane dies of this general character suffice to produce the tapering end shown in Fig. 1. By giving a crosswise curve or slant to the part of the threading die on which the entering end of the screw is rolled, they are made to roll the long tapered end shown in Fig. 5. This has the full thread to the end of the taper, as well as on the cylindrical part of the blank. The necessity of special milling angles for very short screws to prevent their skewing during rolling is in this way avoided.

As illustrative of dies which may be used for rolling fastening screws of this application reference is to be had to the enlarged detail views of Figs. 6, 7, 8 and 9, in which when the dies of Figs. 6 and 7 are turned toward each other into vertical planes they will face each other as they do in use. The threading die, 13 in these figures also, is the stationary die and is usual in character. The grooving die 14 has the grooving ribs 15 whose height equals the depth of the threading grooves 16 plus about 30% of said depth for final screw clearance $a$, Figs. 8 and 10. To economize space less than the full amount of this clearance space is shown in some of the figures. It is essential only that the sharp edges of the screw expanded in rolling do not touch the portions of the die face between the grooving ribs. These ribs are milled into the working face of the die at an angle which governs the steepness or pitch of the longitudinal grooves, and gives them the location at approximately right angles to the screw thread and the reverse spiral character already referred to. This is best for easy and correct rolling as well as for thread cutting and provides sufficient steepness for ready chip disposal. To this end the grooving ribs slope downward and forward across the die face. In theory the angle (angle to the vertical) varies with each change in pitch of the thread and/or in diameter of the blank, the lower the pitch the higher should be the angle. The length of the blank also must be considered and measures taken to prevent its skewing under the pressure during rolling so as to spoil the screw. Overlap of the grooving die ribs, an easier back slope angle in the die rib, or special treatment of the part of the threading die which rolls the leading end of the blank will eliminate this danger. For particular screws differing in size or character, there is a permissible range of from 4° to 14° in the milling angle for the grooving die rib (approximately 5° to 15° helix angle of the groove in the screw). The same range that is good for cutting is also good for the flow of chips. 4° or 6° is better than 0° (vertical) but the strain in rolling the steep spiral grooves at these angles is considerable. It is found, however, that by avoiding a high backslope angle in the die rib and by using a moderate angle of about 45°, a milling angle of 10° or 11°, as the case may be, 10° in the die of Fig. 6 and 11° in that of Fig. 10, can be made to serve effectively for a predetermined range of screw sizes, the differences being very slight. These angles are subject to slight variation to meet special conditions.

A vertical milling angle (no slope) besides involving strain in rolling, results in an axial groove which gives undesirable meeting angles with the thread. A rearward slant gives a spiral in the same sense as the screw thread, which, compared with a spiral in the reverse sense, is relatively ineffective for thread cutting by the screw (for reasons already stated), for chip disposal, and for the readiest and most efficient rolling.

As has already been made apparent, the backslope angle of the grooving die rib profile must also be considered in this connection since it largely determines ease or difficulty of rolling and of milling the die ribs. The practicable range of backslope angle is from 40° to 50°. A high angle, as 50°, might compel a variety of milling angles. It requires more pressure in rolling and results in digging in deeper of the cutting end of the grooving die rib, and is a relatively weaker rib, though this matters little in rolling blanks of softer materials as brass. It tends to sharpen the thread, however, and gives a greater arcuate length of thread segment on the finished screw in proportion to the groove width, thus increasing the thread-gripping properties of the screw. On the whole a backslope angle of approximately 45° is found to give the best all-around results, that is, it gives easier rolling and greater flexibility to varying conditions of blank material, etc., and insures a sufficient thread contact area to the thread segments of the screw even where the member threaded by the screw is thin and the longitudinal grooves are run all the way to the head of the screw.

The grooving die profile shown in Fig. 8 is typical, as well as actual, since it indicates the essential nature of the grooving die profiles which, however, vary according to the pitch diameter of the screw and the number of longitudinal grooves, shortening or lengthening the space occupied on the die by a grooving rib and its adjacent groove. The die profiles also vary according to the way in which such space is to be apportioned between the rib and the groove, as will shortly appear, and according also to the fineness or coarseness of the thread, the lesser or greater depth of the thread valleys, becoming correspondingly shallower or deeper. These grooving rib profile angles are slightly but not materially affected also by the milling angle, being reduced thereby by a few minutes from the theoretical angle choosen. For greater smoothness and ease of rolling, dies are further, as well known to those skilled in the art, adapted, in the actual rolling, to the material and to particular runs of blanks showing exceptional stiffness and intractability by rounding rib corners, etc., but without change in principle. This gives less smearing, a more fluent contour to the groove bottoms and tends to eliminate from them "flats" and angles.

The grooving rib 15 in the die of Fig. 8 has a 45° backslope angle, and as it has also a 0° (vertical) die face angle, the curved undercut relation to the leading ends of the thread segments, for reasons about to be stated, and the elongated curvature of their trailing ends is insured.

The cross-sectional contour of the grooves and of the leading and the trailing ends of the intervening thread segments is mainly determined by the grooving rib face and rib backslope angles, the former establishing the leading end contour and the latter the trailing end contour, as best appears from Figs. 10 to 13. It will be observed that the front and back slope faces do not meet in an angle, the top or side of the die rib remote from the die base being broadened and in the illustrated die substantially flat.

The grooving die section in Fig. 10 is an approximately twenty-five times enlarged portion of a grooving die for an N. C. 24 screw having five longitudinal grooves. In this and all other figures showing dies, it is assumed that the screw being manufactured rolls its own pitch line (pitch circumference) on the pitch line, D. P. L. of the grooving die, the latter being midway between the end of the grooving die rib 17 and the beginning of the clearance $a$. The distance on the screw pitch line spanned by a thread segment and its companion groove, ascertained by dividing the pitch circumference (pitch diameter times pi) by the number of grooves, determines the spacing of successive die ribs. This distance is A. C. in Fig. 10. The backslope angle and the height of the die rib to the clearance, $a$, determine the location of the point B. The ratio $AB/BC$, i. e. die rib width to die groove width should be not more than 1 and is preferably less than 1. It might, for example, be 1 to 1.3. In the die of Fig. 10 it is 1 to 1.5, but is not necessarily held to that value. In the rolling, the rib produces the groove in the screw, and the reciprocal of the ratio referred to roughly approximates the relation between the arcuate length, on the pitch circle, of the thread segment and the groove width in the finished screw. For adequate frictional thread contact area to hold the screw firmly in place in the thread it has cut, the ratio of arcuate length of the thread segment to the width of the groove, both measured on the pitch circle of the screw, should be not less than unity and is preferably more.

In addition to the grooving rib 17, which has a die face angle of 0° (vertical), alternative undercut-producing die ribs, 18, having a die face angle of −32°, and 19 having a die face angle of +5°, and all having the same backslope angle 45° are respectively, indicated in Fig. 10 by a dotted line face, and a dot-and-dash face. A comparison of the grooves rolled by these ribs and, in particular, of the respective undercuts in the leading ends of the thread segments, is presented in Figs. 11, 12 and 13, which are on a scale of 40 to 1. All these ribs yield undercuts and mark the theoretically permissible range of variation of undercut-producing die rib face angle subject to slight deviation to accommodate the nature of the material treated, the wearing of the dies, etc. Large plus angles, greatly exceeding the undercut-producing angular range above given, are excluded as giving markedly convex leading end contours entirely unsuited to the present purpose. Smaller plus angles in excess of the undercut-producing range are usable though at a sacrifice of ease and cleanness of cut, since the segment end faces they produce do not cut so easily and are harder to turn in. Plus angles within the undercut-producing range stated give undercut leading end contours especially suitable for screws to be used in presized holes in relatively hard, tough material, as steel or cast iron. Minus angles within the range stated and particularly toward its close give sharper undercuts especially effective in softer materials as brass and in brittle materials, as Bakelite, other plastics and pressed materials. In all these figures, the die ribs coming from the right and passing to the left produce the groove contours respectively shown therein. The contours of the leading ends are made by the rib faces, or by the front corner in the case of the −32° rib, the rearwardly and outwardly inclined portion, if any, of the leading end of the thread segment being formed by the die rib face as the rib enters, this portion being later forced outward during the formation of the undercut without further rib face contact. The contours of the trailing ends are formed by the backslope and back-corner of the ribs mainly as the rib is leaving the groove. The pitch line of the screw, S. P. L., rolls on the pitch line of the die, D. P. L. The amount of the undercut, i. e. its greatest distance back of the radius R. though the most advanced point of the leading end of the thread segment is indicated in each figure by the pair of opposed arrows. It is greatest in Fig. 12, less in Fig. 11 and still less in Fig. 13, the plus angle giving the least undercut. The undercuts not being identical are designated respectively as 20, 21 and 22. All of them have this in common which may be stated to be characteristic of all undercuts of leading segment ends in applicant's screws that they are essentially abrupt, that is to say, they have more of the radial than the circumferential, i. e. the undercut approaches more nearly coincidence with the radial line through the outer end of the undercut than it does coincidence with the circumference drawn through that point around the axis of the screw as center. This means that they combine effective cutting curvature with the solid backing of the entire or practically the entire thread segment.

This abrupt character is emphasized where the diameter of the blank compared with the depth of the teeth to be rolled is increased until the curve of the undercut approaches a straight line and when the elements of the advanced end of a thread segment are actually or essentially radial, they are regarded as steep or abrupt.

Undercut 21 produced by rib 18 goes to the crest and is the longest. Undercut 20 produced by rib 17 ends a little in advance of and below the crest, at about ¾ the height of the leading end of the thread segment, the face portion 23 extending outward and rearward from the end of the undercut to the crest. Undercut 22 is not carried so far but well beyond the pitch circle. The face portion 24 extends from the end of undercut 22 to the crest. How far a particular undercut will go toward the crest is determined by the die rib face angle and to some extent by the character of the material of the blanks, whether tough and intractable or more fluent.

Selection of the point at which the undercut is to stop depends on the nature of the material in which the particular screws are to be used. This determines the strength required and the contour suitable to the performance expected. Ease of rolling and strength of die rib are also considered.

The respective representative undercuts may be measured angularly, as indicated in Fig. 11, in which R. T. is the radial tangent to the undercut, and max. T. and min. T., respectively, the maximum tangent, and the minimum tangent at the thread root where the cutting edges of the advance ends of the thread segments begin. The positive angle between the radial tangent and the maximum tangent is 29° and the negative angle between the minimum tangent at the thread root and the radial tangent is 11°. The part of the curve located within the drill hole diameter, D. H. (giving a cut of 80% screw-thread depth) takes no part in cutting the thread. Where the drill hole diameter is greater, less cutting is required of the screw and its self-holding effect is lessened, as already stated. And the smaller the presized hole the more the strain on the screw, the deeper the cut, and the greater the thread gripping effect in the hole. Risk of shearing the screw head is at the minimum with undercut advance cutting edges, so that a deeper cut may safely be attempted than with cutting edges not of that character. For where the advance end of the thread segment is undercut the screw cuts its thread more readily and more cleanly.

In the operation of these screws, as already explained, most of the thread cutting, in both forms of screw illustrated, and particularly in the screw of Fig. 5 which has the elongated taper, is performed on the taper by segment ends not having their full height and being undercut throughout or for most of their height, as the ends of successive leading segments 12 in Fig. 5, or by undercut portions of segment ends which trail them, i. e. follow in the same thread groove either at once or after an intermediate segment or segments. The action is made apparent in Fig. 11 by the successive contrasting cross-hatchings w, x, y, z, the first three of which indicate initial cutting paths of leading segment ends or leading segment end portions, and the last, the action of the rearwardly and outwardly sloping terminal portion 23 which is, for the most part, the smoothing and compressing of the thread, already cut, to its full intended cross-section. The screw rolled by the vertical (0°) die face rib and having the undercut stopping short of the crest, is, therefore, generally preferred, except for special uses, because of the excellence of its own performance, as well as because of its more ready production and not merely because the rib having the −32° die face which produces the all the way to the crest undercut is less rugged, and increases the difficulty of rolling tough hard material. The contour of the groove shown in Fig. 11 is, in general, preferred also to that shown in Fig. 13 and produced by the rib having the +5° face angle, and to contours produced by other small plus face angles, since the undercut is longer, the rolling easier and the leading end contour of the thread segment more effective.

Where chip disposal is a problem as it is in Bakelite, in cast iron and in pressed materials generally, the large individual and total capacity of the longitudinal grooves, the absence therefrom of sharp or narrow angular pockets and their generally smooth character lengthwise and crosswise of the groove facilitates the passage, or, in dead end holes, the collection of the chips.

Although without hardening the screws have utility for various purposes, they are more frequently hardened after rolling by cyanide, or carburizing process or the like, and after having been so treated, as well as when not subjected to hardening, can be identified by their characteristic features already described.

The entire absence of burrs and the minimizing or substantial elimination of all other aggregations of excess metal not only from the grooves but especially from the sides of the thread valleys promotes ease and cleanness of the thread-cutting action as the screw is turned in.

A further outstanding feature of the screw above described is that it lends itself to manufacture at high speed, low cost and great accuracy.

When made by the rolling process described, the screw has the character of a rolled screw or "rolling" in which both the thread and the grooves undercutting its leading ends have been produced in that manner in the skin of the screw without sacrifice of metal or impairment of the screw body, the longitudinal fibres of the drawn metal wire blanks remaining uncut and the groove skin being compacted in a dense smooth exterior layer. These characteristics, which are apparent to one skilled in the art on inspection of the screw, are accompanied by the required contours of the longitudinal grooves and of the trailing and leading ends of the thread segments to a degree of accuracy and exactness and with a toughness and durability in the product which especially commends it. And screws of this nature are produced commercially in all sizes.

What is claimed is:

1. A fastening screw adapted to cut its own thread in a hole previously prepared in a metal body, comprising a shank of cylindrical contour with an entering end having an elongated taper, said elongated taper having longitudinal grooves defining intervening thread segments having on the taper completely undercut leading ends of less than the full thread height and thread segments trailing the same and having leading ends undercut to points short of the crest.

2. A self-fastening screw adapted to cut its own thread in a presized hole and retain itself therein, having a threaded shank and longitudinal grooves defining intervening thread segments having their leading end faces undercut to a point thereon short of the full height of the segments and extending rearward and outward therefrom to the crest.

3. A self-fastening screw adapted to cut its own thread in a hole previously prepared in a metal body, comprising a threaded shank of cylindrical contour with a tapered entrance end and having steep reverse spiral longitudinal grooves extending throughout the threaded part of the shank with intervening thread segments having their leading ends abruptly undercut by the grooves to points in the leading ends of the thread segments short of the full height of the segments and in advance of the crest and extending rearward therefrom to the crest.

4. A fastening screw adapted to cut its own thread in a hole previously prepared in a metal body, comprising a threaded shank having steep reverse spiral longitudinal grooves with intervening thread segments having leading undercut ends providing curved thread cutting edges and a thread-smoothing-and-compressing face-portion extending rearwardly and outwardly from the outer end of the undercut.

5. A self-fastening screw adapted to cut its own thread in a hole previously prepared in a metal body, comprising a threaded shank of cylindrical contour with a tapered entrance end and having longitudinal grooves with intervening thread segments defined by the grooves and having undercut leading ends and circumferentially-relieved trailing ends, the shank being solid and having a compacted skin on the threaded and on the grooved portions with its metal fibres uncut and the grooves being deeper than the thread valleys but being confined to the skin of the shank and leaving its body section unimpaired.

6. A rolled fasteing screw having a shank of cylndrical contour with a blunt tapered entrance end, threaded both on the cylindrical and on the tapered portion and having longitudinal grooves worked into the shank and extending the whole length of the threaded portion with intervening thread segments defined thereby having abruptly undercut thread-cutting leading ends and circumferentially relieved trailing ends having elongated generally convex curvature, said shank having the dense skin characteristic of rolled screws, and said segments and groove walls and bottoms having their fibres compacted and being confined to the skin.

7. A self-fastening screw adapted to cut its own thread in a hole previously prepared in a metal body comprising a shank rolled to form both threads and grooves worked into the shank with intervening thread segments, said grooves extending from end to end of the threaded portion and providing space for the ready disposal of waste, the thread segments having abrupt thread-cutting leading ends.

8. A self-fastening screw adapted to cut its own thread in a previously prepared hole, comprising a shank of cylindrical contour with a tapered entrance end rolled to form both thread, on both the cylindrical and the tapered part of the shank, and steep reverse spiral longitudinal grooves with intervening thread segments, said grooves extending from end to end of the threaded portion, and said thread segments having undercut advance thread-cutting ends.

9. A fastening screw adapted to cut its own thread in a hole previously prepared in a metal body, comprising a threaded shank of cylindrical contour having a threaded entering end having a taper, said shank having longitudinal grooves defining intervening thread segments having, near the entering end of the screw, leading segment ends of less than the full thread height undercut to their full height by the respectively adjacent grooves, and said grooves defining other thread segments trailing said leading ends and having their own leading ends undercut to points short of the crest and extending rearward and outward therefrom to the crest.

JOHANN MEERSTEINER.